Patented Jan. 1, 1935

1,986,557

UNITED STATES PATENT OFFICE 1,986,557

AGENT CONTAINING ACTIVE SUBSTANCES, AND PROCESS OF PREPARING SAME

Gerald C. Connolly and Jeremiah A. Pierce, Baltimore, Md., assignors, by mesne assignments, to Chester F. Hockley, receiver for The Silica Gel Corporation, Baltimore, Md., a corporation of Maryland No Drawing. Application June 17, 1930, Serial No. 461,339

16 Claims. (Cl. 23—233)

The present invention relates to catalytic masses comprising a carrier having an active substance in the form of more than one compound associated therewith, and processes of preparing same.

Patent 1,577,187 discloses a process of preparing a catalytic agent by treating a hydrogel with a dilute solution of an alkali such as sodium hydroxide for a sufficient length of time to enable more or less of the alkali to be adsorbed in the hydrogel, the concentration of the alkali solution being insufficient to react with the hydrogel, (for example between 0.02 to 0.2% by weight) separating the hydrogel from the solution; rinsing it; treating it with a solution of a salt of a catalytically acting metal for a sufficient length of time to react with the adsorbed alkali and form a compound capable of being converted into a catalytically active form; washing the hydrogel so as to remove the excess catalytic metal salt; and drying it.

Although the process of this patent produces satisfactory and highly efficient catalytic agents, the catalytically acting substance is present in one form only, that is, as a single compound of the metal, and in a limited amount. This process is not of universal application for the production of a catalytic agent having the catalytically acting substance present in more than one form, for example, as compounds of a metal of different valences, or in larger amounts, or as chemical combinations of two catalytically active metals; as chromium vanadate.

It has been found that by employing an alkali solution which is sufficiently strong, not only to charge the carrier material, such as a hydrogel, but also react therewith to a limited extent, and treating the carrier with such solution for a time sufficient to enable the alkali to be adsorbed thereby and also react therewith to a limited degree, followed by treatment with a solution of a salt of a catalytic metal capable of chemically combining with the alkali to form a catalyst, and drying without washing it, an active material results which has the catalytic substance present in more than one form, for example as two different compounds of the same metal but of different valences.

The process according to the present invention comprises treating a carrier material with a solution of a reactant substance or precipitating agent of a concentration greater than 0.25% by weight, so as to fully charge the material, then treating it with a solution of a compound of a metal to be precipitated or of a compound of a metal capable of being converted by said reactant substance into an active compound of said metal, which may or may not contain an activator or stimulator substance, in an amount in excess of that required to chemically combine with said reactant substance, and finally drying without washing. If desired, the carrier material may be treated with a solution of a compound of a metal capable of being converted by a reactant substance into an active compound of said metal and then with a solution of a reactant substance in an amount less than that required to chemically combine with said metal compound, followed by drying without washing. Although both processes produce satisfactory products, the former process is the preferred one.

The present invention comprehends the employment of any carrier material. It may be any hydrogel or jelly, or gelatinous precipitate as for example, the oxides of silicon, germanium, chromium, tungsten, titanium, aluminum, tin, and the like, or partly dehydrated hydrogels or dried gels of said oxides which are hard, porous products having ultra-microscopic pores and contain preferably about 3 to 12 per cent of moisture. Then again, it may consist of a powdered solid material of any nature which is unaffected by heat or chemical reaction to such degree as to destroy its value as a carrier, for example, fuller's earth, kieselguhr, gel fines of any kind, and the like.

The reactant substance precipitating agent with which the carrier material is treated may be either a compound capable of being selectively adsorbed by the carrier material, as for example, a hydroxyl bearing compound or one which diffuses into the carrier material without being selectively adsorbed thereby, as for instance a non-hydroxyl bearing compound. The hydroxyl bearing compound may consist of an aqueous solution of either the hydroxides of the alkali metals, as sodium, potassium, lithium, caesium, rubidium; the hydroxides of the alkaline earth metals, as calcium, strontium, and barium; the hydroxides of the non-metals such as ammonium hydroxide; hydroxyl containing amines such as the ethanolamines, mono-, di-, and tri-ethanolamines, hydroxylamine; or compounds which hydrolyze readily and yield upon hydrolysis compounds exhibiting the properties of the hydroxides of the alkali bearing metals such as the carbonates of the alkali forming metals, and carbamates.

The non-hydroxyl bearing compound may consist of an aqueous solution of either a salt of a metal which, when the carrier material impregnated therewith is treated with a solution of a salt of another metal, reacts therewith to form an active compound of said other metal, as for example, salts of the alkali metals, potassium vanadite, soluble salts of silver, chromium, zinc, palladium, platinum, tin, iron, calcium, copper, nickel, etc.; or non-hydroxyl containing amines such as aniline and the like.

The metal compound capable of being converted by a reactant substance into an active compound of said metal or compound of a metal to be precipitated, may be a salt of a metal capable of forming either hydrous oxides or insoluble basic salts upon reaction with said reactant substance. The metallic salts which may be used for this purpose are those of the metals such as iron, chromium, aluminum, gallium, indium, thorium, copper, cobalt, nickel, silver, gold, beryllium, magnesium, zinc, cadmium, mercury, lead, germanium, tin, titanium, zirconium, cerium, terbium, yttrium, bismuth, molybdenum, tungsten, uranium, manganese, ruthenium, rhodium, palladium, caesium, iridium, vanadium, and platinum. Of the salts of the metals mentioned, it is preferred to use those of vanadium.

The concentration of the solution of the reactant substance with which the carrier material is treated is dependent upon the nature of the carrier material and the amount of active metal compound required in the final product. In the case where the carrier is a hydrogel, and the reactant substance is a hydroxyl bearing compound, the strength of the hydroxyl bearing compound solution should be such as to charge the hydrogel and also react therewith to a limited extent or to such degree as to modify its character without destroying the structure. A solution of a strength ranging from 0.25 to 1% by weight and even as high as 5% by weight has been found to give satisfactory results.

Where the carrier material is a hydrogel and the reactant substance is a non-hydroxyl bearing compound which is chemically inert with respect to the hydrogel, the strength of the non-hydroxyl bearing compound solution may range from 0.5% to 10% by weight or even higher. The same strengths are employed if the carrier material is other than a hydrogel.

It is to be understood that the concentration of the reactant substance solution is variable. All that is required to obtain a satisfactory product is that the concentration be more than required to charge the carrier material.

The concentration of the solution of the metal compound capable of being converted by a reactant substance into an active compound of said metal is dependent upon the amount of active compound required in the final product. The solution used should be of a strength slightly in excess of that required to chemically combine with the reactant substance.

Where it is desired to produce a product having an activator or stimulator substance present therein, the substance is admixed with the solution of the metal compound capable of being converted by a reactant substance into an active compound of said metal. Such substance may be a salt of aluminum as aluminum sulphate; compounds of boron such as sodium tetraborate, or potassium tetraborate; compounds of calcium such as calcium chloride; or salts of tin, iron, thorium, bismuth, beryllium, titanium, and other metals.

The product obtained by the process according to the present invention consists of granules of carrier material having a plurality of series of rings or otherwise localized layers of precipitates of different or variable colors disposed therein consisting of different compounds of either the same or different metals. The formation of these rings or localized layers of precipitates upon and in the granules of the carrier material is attributed to the "Liesegang Ring Phenomenon". It is thought that when a carrier material such as a hydrogel or jelly which has been thoroughly washed is immersed in a metallic salt solution, the solution diffuses into the jelly or hydrogel without any convection disturbances. On the other hand, when a hydrogel or jelly which has been saturated with a solution of a reactant substance such as a hydroxyl bearing compound is immersed in a metallic salt solution, the metallic solution diffuses into the pores of the hydrogel and reacts therewith to form a hydroxide precipitate which is deposited at the spot where it is formed because the pore walls prevent the precipitate from moving about. This precipitate in the form of a ring or layer grows in thickness as more of the diffusing metallic salt reacts with the hydroxyl bearing compound solution within the pores until it forms a dam or semi-permeable membrane, through which more of the metallic salt solution is forced by osmotic pressure. At this stage some of the molecules of the metallic salt solution collect about the exterior surfaces of the semi-permeable membrane of hydroxide precipitate. As the metallic salt solution continues to diffuse into the hydrogel it meets these molecules of metallic salt solution retained about the exterior surfaces of the hydroxide precipitate membrane and forms a supersaturated metallic salt solution at this point. This supersaturation of the metallic salt solution causes a portion of the metallic salt to be thrown out of solution and deposited as a layer or ring in close proximity to the ring of semi-permeable hydroxide precipitate while the rest remains in solution until dried. Where the metallic salt solution is that of a salt of vanadium as for example vanadyl sulphate, the ring or layer of hydroxide precipitate is brown in color, and that of the deposited vanadium salt is blue.

This process continues until the rings have spread from one end of the jelly or hydrogel to the other, the brown rings becoming narrower and less vivid than the first ones formed. The diffusion of the metallic salt solution into the hydrogel may continue even after all of the hydroxyl bearing solution has been used up in the reaction. Thus, the hydrogel will contain alternating layers or rings of the hydroxide precipitate and the deposited metallic salt. After drying the hydrogel, the product consists of gel granules having alternate layers or rings of hydroxide and the dehydrated metallic salt.

This ring formation depends on the particular reactant substance and metallic salt selected, and the concentration of the solutions thereof. To form perfect rings the concentration of the solutions must be such that there is no greater osmotic pressure outwardly than inwardly within the voids or pores of the carrier material or the reaction will take place either in the supernatant solution or on the surface of the carrier instead of within the voids. In other words, the pressure must be great enough to penetrate entirely through the carrier material.

If all of the reactant substance present in the carrier material is adsorbed within the pores, particularly if a hydroxyl bearing compound as sodium hydroxide is used, a precipitate forms at the spot where the adsorbed hydroxyl ion is located when the metallic salt comes in contact therewith, but no rings will form because there is no outward diffusion of the adsorbed alkali. Again, if the alkali is present in an amount more than enough to be entirely adsorbed, a precipitate will form both on the walls and within the pores of the carrier material when the metallic salt solution comes in contact with the alkali. These precipitates, however, may be formless because of disturbances in equilibrium.

When the two solutions come in contact within the pores of a carrier material no matter whether one is adsorbed or not, the precipitate which forms may be slightly soluble or be easily peptized, and the diffusion of this material will obscure the ring effect. In many cases the soluble reaction product may have a higher rate of diffusion than one or both of the reactant solutions. Furthermore, side reactions may occur producing a precipitate which may obscure that formed by the reactant substances and the metallic salt solution. Then again, the presence of activator substances in the metallic salt solution may obscure the ring effect.

Thus, in some instances the product will show a perfect ring effect, in others an imperfect ring formation, and in still others none at all. Whether the product shows this ring formation or not is immaterial for it is the presence of two different compounds of the same or different metals which are distributed in the granules of the carrier material in close proximity to each other that determines its efficiency and activity.

The product thus obtained is particularly suited for use as a catalyst in processes such as the process for making sulphur trioxide by reacting an oxidizing gas with sulphur dioxide in the presence of a catalyst at an elevated temperature. Processes of this nature in which it is employed as a catalyst show a conversion of sulphur dioxide into sulphur trioxide of 98.5% or more.

Specific examples of the process are as follows:

*Example 1*

A vanadyl sulphate solution is prepared in any well-known manner as by suspending vanadic oxide ($V_2O_5$) in a dilute solution of sulphuric acid, heating it to almost the boiling point, injecting or blowing sulphur dioxide gas into the mixture until the vanadic oxide has dissolved, and then boiling off the excess sulphur dioxide. The resulting solution is a dark blue color.

A carrier material such as a hydrogel of silica, preferably with a dry surface, is immersed in a solution of a hydroxyl bearing compound, as for example sodium hydroxide of about 1% strength by weight, and is allowed to remain therein for a sufficient time to enable the alkali to be adsorbed and react with the hydrogel to a limited extent but not to such a degree that the structure of the hydrogel is destroyed. Soaking the hydrogel in the sodium hydroxide solution for a number of hours, say 18 hours, is sufficient.

The hydrogel is separated from the sodium hydroxide solution in any well-known manner as by draining, rinsed once in water, and then placed upon a sieve and allowed to remain there until the water drains from its exterior surface.

The hydrogel, charged with the sodium hydroxide, is next immersed in the solution of vanadyl sulphate prepared in the manner indicated above. It is allowed to remain therein until the reaction between the vanadyl sulphate and sodium hydroxide is complete. Usually immersion for a number of hours, say 24 hours, is sufficient. The strength of the vanadyl sulphate solution is such that there is a slight excess after the soaking has been completed. A vanadyl solution containing 0.0327 gram per cubic centimeter of water expressed as $V_2O_5$ gives satisfactory results. Although a vanadyl sulphate solution of the aforesaid strength is used, it is to be understood that solutions of a greater or lesser strength may be employed.

The hydrogel is then drained, rinsed once with water, and dried in any suitable manner. The drying converts the hydrogel into a hard, glassy-like, porous material termed the "gel". The drying may be effected by passing air at a temperature of 75° to 120° C. over the hydrogel and later at a higher temperature as 300° to 400° C.

The product thus obtained consists of granules of silica gel having a plurality of series of rings of different colors disposed therein. One of the rings is blue, another brown, while still other rings are a vague blend of the two colors, blue and brown. The blue ring consists of dehydrated vanadyl sulphate, and the brown ring of the hydroxide of tetravalent vanadium. That the rings of different colors are present in the gel granules may be readily determined by subjecting the granules to a brief leaching with water whereupon the blue ring disappears and colors the water blue while the brown ring remains fixed. Thus, the gel granules contain vanadium of two different valences in the form of compounds of tetravalent and pentavalent vanadium, and these vanadium compounds are distributed in the gel granules in close proximity to each other.

*Example 2*

A carrier material such as a silica hydrogel is treated in the same manner as in Example 1 but a vanadyl sulphate solution containing an activator substance is used. The vanadyl sulphate is prepared in the manner described in Example 1. To this solution is added an activator substance for example, potassium tetraborate in an amount of 10 grams of the tetraborate to each 300 cc. of the vanadyl sulphate solution.

The product consists of gel granules having a plurality of localized layers of precipitates of different compounds of vanadium distributed in close proximity to each other but the ring effect may or may not be present because of the presence of the boron.

*Example 3*

A carrier material such as silica hydrogel is treated in the same manner as in Example 1 but in place of sodium hydroxide, a solution of potassium carbonate of 1 to 10%, preferably 5%, strength by weight is used.

The product consists of gel granules having a plurality of localized layers of precipitates of different compounds of vanadium distributed in close proximity to each other. The ring effect may or may not be present.

*Example 4*

A carrier material such as a hydrogel of silica, preferably with a dry surface, is immersed in a solution of ammonium hydroxide of about 1% strength by weight, and is allowed to remain therein for sufficient time to enable the alkali to be adsorbed and react with the hydrogel to a limited extent but not to such a degree that the structure of the hydrogel is destroyed. Soaking the hydrogel in the ammonium hydroxide solution for a number of hours, say 18 hours, is sufficient.

The hydrogel is separated from the ammonium hydroxide solution in any well known manner as by draining, rinsed once in water, and then placed upon a sieve and allowed to remain there until the water drains from its exterior surface.

The hydrogel charged with ammonium hydroxide, is next immersed in a solution of vanadyl sulphate prepared as described in Example 1. It is allowed to remain therein until the reaction between the vanadyl sulphate and ammonium hydroxide is complete. Usually immersion for a number of hours, say 24 hours, is sufficient. The strength of the vanadyl sulphate solution is such that there is a slight excess after the soaking has been completed. A vanadyl solution containing 0.0327 gram per cubic centimeter of water expressed as $V_2O_5$ gives satisfactory results. Although a vanadyl sulphate solution of the aforesaid strength is used, it is to be understood that solutions of a greater or lesser strength may be employed.

The hydrogel is then drained, rinsed once with water, and dried in any suitable manner. The drying converts the hydrogel into a hard, glassy-like, porous material termed the "gel". The drying may be effected by passing air at a temperature of 75° to 120° C. over the hydrogel and later at a higher temperature as 300° to 400° C.

The product thus obtained consists of granules of silica gel having a plurality of series of rings of different colors disposed therein. One of the rings is blue, another brown, while still other rings are a vague blend of the two colors, blue and brown. The blue ring consists of dehydrated vanadyl sulphate and the brown ring of the hydroxide of tetravalent vanadium. That the rings of different colors are present in the gel granules may be readily determined by subjecting the granules to a leaching with water whereupon the blue ring disappears and colors the water blue while the brown ring remains fixed. Thus, the gel granules contain vanadium of two different valances in the form of compounds of tetravalent and pentavalent vanadium, and these vanadium compounds are distributed in the gel granules in close proximity to each other.

*Example 5*

A carrier material consisting of a tightly packed mass of finely divided kieselguhr is placed in a receptacle. An ammonium hydroxide solution is then introduced into said receptacle in an amount sufficient to submerge the kieselguhr. The concentration of the ammonium hydroxide solution employed is of about 2% strength by weight. Soaking for a number of hours, for instance 20 hours, is sufficient to fully charge the mass of carrier material. The ammonium hydroxide solution is then separated from the mass of carrier material as by draining.

A solution of vanadium acetate is then introduced into the receptacle in an amount sufficient to completely submerge the mass of kieselguhr charged with ammonium hydroxide. The vanadium salt solution should be of a concentration such as to be slightly more than that required to chemically combine with all of the alkali. A vanadium acetate solution of about 0.5 N. gives good results.

The mass is then drained, and dried in any suitable manner.

The product contains a plurality of localized layers of a hydroxide precipitate of vanadium and dehydrated vanadium acetate distributed in close proximity to each other. The ring effect may or may not be present.

*Example 6*

A mass of gel fines of silica is placed in a receptacle in such manner as to form a tightly packed mass. A calcium chloride solution is then introduced into the receptacle in an amount sufficient to cover the mass of gel fines. The concentration of calcium chloride solution may vary from 0.1 to 1.0 normal. The mass of gel fines is allowed to soak in the calcium chloride solution for a number of hours, say 24 hours, whereupon it is separated therefrom as by draining.

A sodium ortho-vanadate solution is next introduced into the receptacle in an amount sufficient to completely submerge the gel fines. The concentration of the sodium vanadate solution is such as to be slightly in excess of that required to react with the calcium chloride. A sodium vanadate solution of about 1 normal gives satisfactory results. Soaking for a number of hours, say 24 hours, is sufficient to complete the reaction.

The impregnated carrier material is then drained, and dried in any suitable manner.

The product contains layers of calcium vanadate and dehydrated sodium vanadate distributed in close proximity to each other.

*Example 7*

A silica hydrogel is immersed in a solution of ammonium vanadite and allowed to remain therein for about 24 hours or less. The concentration of the ammonium vanadite solution may range from 0.1 to 2 normal. It is preferred to employ a 0.3 N. solution of ammonium vanadite.

The hydrogel is separated from the ammonium vanadite solution in any well known manner as by draining, rinsed once in water and then allowed to drain.

The hydrogel charged with the ammonium vanadite is next immersed in a solution of chromium chloride, the concentration of which may vary from 0.1 to 1 normal. It is preferred to employ a 0.1 N. chromium chloride solution. Usually soaking for about 24 hours is sufficient to complete the reaction.

The hydrogel is then drained, rinsed once with water and dried in the same manner as given in Example 1.

The product consists of gel granules having layers of chromic vanadite and dried chromium chloride distributed in close proximity to each other.

*Example 8*

A washed hydrogel of silica is soaked in a 0.3 normal potassium vanadite solution for a number of hours, for example 24 hours or less. It is rinsed once with water, and then immersed in 0.1 N. solution of chromium chloride. The amount of the chromium chloride solution used is such as to be slightly in excess of that required to react with the vanadite solution. Soaking for, say 24 hours, is sufficient to complete the reaction.

The hydrogel is then rinsed once in water, and dried in the same manner as in Example 1.

The product consists of gel granules having a plurality of layers of chromic vanadite and dehydrated chromium chloride distributed in close proximity to each other.

Where the product obtained according to the process of the present invention is desired to be used as a catalyst in a contact process for making sulphur trioxide it is preferred to activate same as by heating it for several hours at a temperature from 400° to 500° C. in the presence of sulphur dioxide gas.

Various specified details of procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. The process of impregnating catalyst carriers with metallic catalytic agents which comprises impregnating the carrier material with a solution of a precipitating agent the concentration of which is sufficiently strong to charge the carrier material and react therewith to a limited extent, then treating the impregnated carrier with a solution of a compound of a metal to be precipitated, said solution being in excess, and then drying the resulting mass.

2. The process according to claim 1 wherein the precipitating agent is a hydroxyl bearing compound.

3. The process according to claim 1 wherein the precipitating agent is a non-hydroxyl bearing compound.

4. The process of impregnating catalyst carriers with metallic catalytic agents which comprises impregnating a hydrogel with a solution of a precipitating agent the concentration of which is such as to charge the hydrogel by adsorption and react therewith to a limited extent, then treating the impregnated hydrogel with a solution of a compound of a metal to be precipitated, said solution being in excess, and then drying the resulting mass.

5. The process according to claim 4 wherein the hydrogel is that of silica.

6. The process according to claim 4 wherein the solution with which the impregnated hydrogel is treated contains both a compound of a metal to be precipitated and an activator substance.

7. The process according to claim 4 wherein the hydroxyl bearing substance is a hydroxide of one of the member of the group consisting of alkali metals, alkaline earth metals, and ammonium.

8. The process of impregnating catalyst carriers with metallic catalytic agents which comprises impregnating a hydrogel with a solution of a hydroxide of one of the members of the group consisting of alkali metals, alkaline earth metals, and ammonium, the concentration of which is greater than 0.25% by weight, then treating the impregnated hydrogel with a solution of a compound of a metal to be precipitated, said last named solution being in excess, and then drying the resulting mass.

9. The process according to claim 8 wherein the solution with which the impregnated hydrogel is treated contains both a compound of a metal to be precipitated and an activator substance.

10. The process according to claim 8 wherein the metal compound is a salt of vanadium.

11. The process according to claim 8 wherein the metal compound is vanadyl sulphate.

12. The process of impregnating catalyst carriers with metallic catalytic agents which comprises impregnating a hydrogel with a solution of a non-hydroxyl bearing substance capable of precipitating the metal subsequently used, separating the impregnated hydrogel from the solution, treating the hydrogel with a solution of a compound of a metal to be precipitated, said last named solution being in excess, and then drying the resulting mass.

13. The process according to claim 12 wherein the hydrogel is that of silica.

14. The process according to claim 12 wherein the non-hydroxyl bearing substance is a salt of a metal capable of reacting with a salt of another metal to form an active compound of said other metal.

15. The process according to claim 12 wherein the non-hydroxyl bearing compound is a salt of chromium and that of the metal compound a salt of vanadic acid.

16. An agent consisting of a hard, porous, gel having an active substance in the form of a plurality of groups of rings deposited therein, each group having one ring consisting of an active compound of tetravalent vanadium, and another ring consisting of an active compound of pentavalent vanadium.

GERALD C. CONNOLLY.
JEREMIAH A. PIERCE.